United States Patent
Kelton et al.

(10) Patent No.: US 12,033,037 B2
(45) Date of Patent: Jul. 9, 2024

(54) OPEN FEATURE LIBRARY MANAGEMENT

(71) Applicant: International Business Machines Corporation, Armonk, NY (US)

(72) Inventors: Eugene Irving Kelton, Mechanicsburg, PA (US); Brandon Harris, Union City, NJ (US); Willie Robert Patten, Jr., Hurdle Mills, NC (US); Russell Gregory Lambert, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 990 days.

(21) Appl. No.: 17/000,415

(22) Filed: Aug. 24, 2020

(65) Prior Publication Data

US 2022/0058519 A1  Feb. 24, 2022

(51) Int. Cl.
*G06N 20/00* (2019.01)
*G06F 9/445* (2018.01)
*G06F 16/22* (2019.01)

(52) U.S. Cl.
CPC ......... *G06N 20/00* (2019.01); *G06F 9/44521* (2013.01); *G06F 16/221* (2019.01)

(58) Field of Classification Search
CPC ... G06N 20/00; G06F 9/44521; G06F 16/221; G06F 16/2465
See application file for complete search history.

(56) References Cited

U.S. PATENT DOCUMENTS

| | | |
|---|---|---|
| 6,671,811 B1 | 12/2003 | Diep et al. |
| 7,593,903 B2 | 9/2009 | Forman et al. |
| 8,630,823 B2 | 1/2014 | Yoneda et al. |
| 8,639,034 B2 | 1/2014 | Liu et al. |
| 9,189,750 B1 | 11/2015 | Narsky |
| 9,372,976 B2 | 6/2016 | Bukai et al. |
| 10,135,848 B2 | 11/2018 | Muddu et al. |
| 10,169,715 B2 | 1/2019 | Dirac et al. |

(Continued)

FOREIGN PATENT DOCUMENTS

| | | |
|---|---|---|
| EP | 3594822 A1 | 1/2020 |
| WO | 2016142531 A1 | 9/2016 |

(Continued)

OTHER PUBLICATIONS

Kelton et al., "Optimization for Open Feature Library Management", U.S. Appl. No. 17/000,415, filed Aug. 24, 2020, 44 pages.

(Continued)

*Primary Examiner* — Joseph J Dallo
(74) *Attorney, Agent, or Firm* — Lily Neff (57) ABSTRACT

In an approach for managing an open feature library, a processor collects feature metadata from a data source, the feature metadata being data related to features for training a machine learning model. A processor builds a feature pipeline for the features based on the collected feature metadata. The feature pipeline may be a set of defined and active features. A processor executes the feature pipeline including computing the features. A processor executes a machine learning model using the computed features. A processor evaluates the features and corresponding model results.

20 Claims, 6 Drawing Sheets

(56) References Cited

U.S. PATENT DOCUMENTS

| | | | |
|---|---|---|---|
| 10,419,450 | B2 | 9/2019 | Muddu et al. |
| 10,419,465 | B2 | 9/2019 | Muddu et al. |
| 10,430,716 | B2 | 10/2019 | Yamamoto |
| 2012/0254077 | A1 | 10/2012 | Porikli |
| 2015/0039344 | A1 | 2/2015 | Kinney et al. |
| 2016/0358268 | A1 | 12/2016 | Verma et al. |
| 2018/0046869 | A1* | 2/2018 | Cordell ............... G08B 21/06 |
| 2018/0218283 | A1 | 8/2018 | Jenson |
| 2018/0253737 | A1 | 9/2018 | Hanis et al. |
| 2018/0349527 | A1* | 12/2018 | Li ............... G06N 3/08 |
| 2018/0357714 | A1 | 12/2018 | So et al. |
| 2018/0373781 | A1 | 12/2018 | Palrecha |
| 2019/0073647 | A1 | 3/2019 | Zoldi et al. |
| 2019/0079994 | A1 | 3/2019 | Ma et al. |
| 2019/0114649 | A1 | 4/2019 | Wang et al. |
| 2019/0141183 | A1 | 5/2019 | Chandrasekaran et al. |
| 2019/0266170 | A1* | 8/2019 | Hazel ............... G06F 16/221 |
| 2019/0287032 | A1* | 9/2019 | Seabolt ............... G06Q 50/265 |
| 2020/0019881 | A1 | 1/2020 | Luo et al. |
| 2020/0151588 | A1* | 5/2020 | Doan Huu ............... G06N 20/00 |
| 2020/0159848 | A1* | 5/2020 | Yeo ............... G06N 20/00 |
| 2021/0081377 | A1 | 3/2021 | Polleri |
| 2021/0350273 | A1 | 11/2021 | Huu |

FOREIGN PATENT DOCUMENTS

| | | | |
|---|---|---|---|
| WO | 2018027138 A1 | 2/2018 | |
| WO | WO-2018218259 A1 * | 11/2018 | ......... G06F 16/1794 |

OTHER PUBLICATIONS

List of Patent Applications Treated As Related, "Appendix P", Filed Herewith, 2 pages.

"Oracle Database Semantic Technologies", Oracle Feature Overview, Copyright 2009, 3 pages.

"Personality matching in conversational system based on language and knowledge", An IP.com Prior Art Database Technical Disclosure, Disclosed Anonymously, IP.com No. IPCOM000255262D, IP.com Electronic Publication Date: Sep. 13, 2018, 6 pages.

"Recognizing Semantic Formatting Information in a Document", An IP.com Prior Art Database Technical Disclosure, Disclosed Anonymously, IP.com No. IPCOM000251990D, IP.com Electronic Publication Date: Dec. 13, 2017, 35 pages.

Goel et al., "Can Linguistic Predictors Detect Fraudulent Financial Filings?", Journal of Emerging Technologies in Accounting, vol. 7, 2010, pp. 25-46.

Minhas, Saliha, "A Corpus Driven Computational Intelligence Framework for Deception Detection in Financial Text", Thesis submitted in accordance with the requirements of the University of Stirling for the degree of Doctor of Philosophy, Division of Computing Science and Mathematics, School of Natural Sciences, University of Stirling, Scotland, UK,Nov. 2016, 289 pages.

Patten Jr., et al., "Automatic Combinatoric Feature Generation for Enhanced Machine Learning", U.S. Appl. No. 16/830,611, filed Mar. 26, 2020, 30 pages.

Wang et al., "Method and System for Ad Traffic Fraud Detection Using Machine Learning", An IP.com Prior Art Database Technical Disclosure, IP.com No. IPCOM000257071D, IP.com Electronic Publication Date: Jan. 14, 2019, 5 pages.

* cited by examiner

OPEN FEATURE LIBRARY MANAGEMENT

BACKGROUND

The present disclosure relates generally to the field of machine learning, and more particularly to managing an open feature library related to generating features for an artificial intelligence machine learning system.

In machine learning, a data scientist may work with a business subject matter expert to determine a set of features to generate. Analysis may be needed to support a given domain. Machine learning models may be written to utilize the set of features to support inquiries regarding the given subject matter domain. Feature extraction may start from an initial set of measured data and may build derived values (features) intended to be informative and non-redundant. Feature extraction may be related to dimensionality reduction. When the input data to an algorithm is too large to be processed, the input data can be transformed into a reduced set of features. Feature selection may be to determine a subset of the initial features. The selected features may contain the relevant information from the input data, so that the desired task can be performed by using this reduced representation instead of the complete initial data.

SUMMARY

Aspects of an embodiment of the present disclosure disclose an approach for managing an open feature library. A processor collects feature metadata from a data source, the feature metadata being data related to features for training a machine learning model. A processor builds a feature pipeline for the features based on the collected feature metadata. The feature pipeline may be a set of defined and active features. A processor executes the feature pipeline including computing the features. A processor executes a machine learning model using the computed features. A processor evaluates the features and corresponding model results.

DETAILED DESCRIPTION

The present disclosure is directed to systems and methods for managing an open feature library related to generating open features for an artificial intelligence machine learning system.

Embodiments of the present disclosure recognize a need for managing an end to end lifecycle of features within a cognitive system. Embodiments of the present disclosure disclose an approach benefiting the cognitive system by providing a general feature library management, leveraging an open feature generator, managing the state of systems and models in relation to the features, and optimizing the feature profile configurations.

Figure 1:
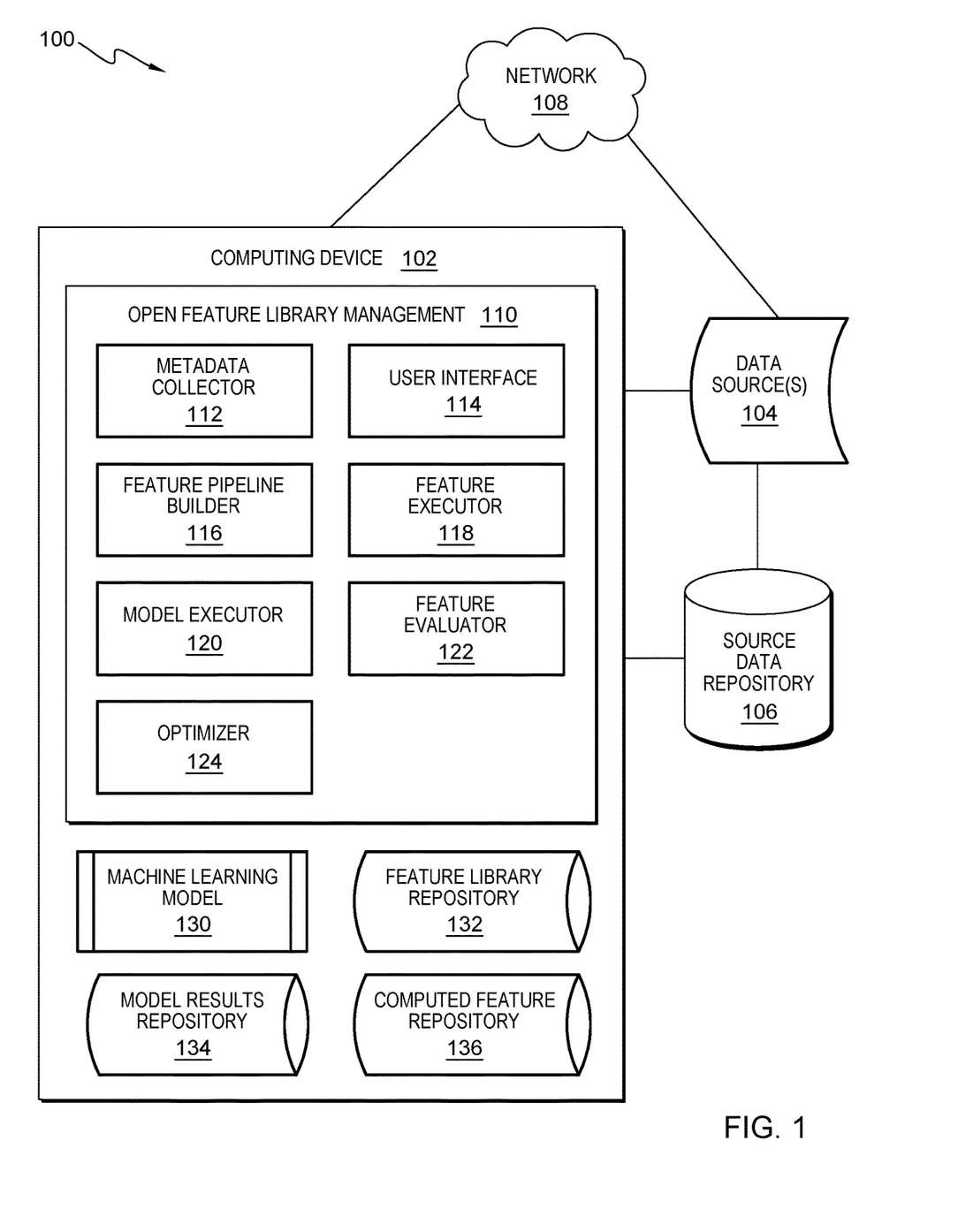
FIG. 1 is a functional block diagram illustrating an open feature library management environment, in accordance with an embodiment of the present disclosure.

The present disclosure will now be described in detail with reference to the Figures. FIG. 1 is a functional block diagram illustrating open feature library management environment, generally designated 100, in accordance with an embodiment of the present disclosure.

In the depicted embodiment, open feature library management environment 100 includes computing device 102, data source(s) 104, source data repository 106, and network 108. In the depicted embodiment, data source(s) 104 and source data repository 106 are located externally and may be accessed through a communication network such as network 108. Data source(s) 104 and source data repository 106 may be directly accessed with computing device 102. In other embodiments, data source(s) 104 and source data repository 106 may be located on computing device 102. In one or more embodiments, data source(s) 104 are sources that open feature library management 110 may receive inputs from. For example, data source(s) 104 may be from network 108, a corpus of electronic files or other data, a content creator, content users, and other possible sources of input. In one embodiment, some or all of the inputs to open feature library management 110 in computing device 102 may be routed through network 108. In one embodiment, a content creator may create content in electronic files for use as part of a corpus of data with open feature library management 110. Electronic files may include any file, text, article, or source of data for use in open feature library management 110. Content users may access open feature library management 110 via a network connection or an Internet connection to network 108. In an embodiment, source data from data source(s) 104 may be stored in source data repository 106. Source data repository 106 may also include pre-existing source data.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to open feature library management 110, data source(s) 104, source data repository 106, and network 108 and is capable of processing program instructions and executing open feature library management 110, in accordance with an embodiment of the present disclosure. Computing device 102 may include internal and external hardware components, as depicted and described in further detail with respect to FIG. 6.

Further, in the depicted embodiment, computing device 102 includes open feature library management 110, machine learning model 130, feature library repository 132, model results repository 134, and computed feature repository 136. In some embodiments, machine learning model 130, feature library repository 132, model results repository 134, and computed feature repository 136 may be located on open feature library management 110 of computing device 102. In the depicted embodiment, open feature library management 110, machine learning model 130, feature library repository 132, model results repository 134, and computed feature repository 136 are located on computing device 102. However, in other embodiments, open feature library management 110, machine learning model 130, feature library repository 132, model results repository 134, and computed feature repository 136 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and open feature library management 110, machine learning model 130, feature library repository 132, model results repository 134, and computed feature repository 136, in accordance with a desired embodiment of the disclosure.

In the depicted embodiment, open feature library management 110 includes metadata collector 112, user interface 114, feature pipeline builder 116, feature executor 118, model executor 120, feature evaluator 122, and optimizer 124. In the depicted embodiment, metadata collector 112, user interface 114, feature pipeline builder 116, feature executor 118, model executor 120, feature evaluator 122, and optimizer 124 are located on open feature library management 110 and computing device 102. However, in other embodiments, metadata collector 112, user interface 114, feature pipeline builder 116, feature executor 118, model executor 120, feature evaluator 122, and optimizer 124 may be located externally and accessed through a communication network such as network 108.

In one or more embodiments, open feature library management 110 is configured to collect feature metadata. Feature metadata may be data and information about features that are generated to use to train machine learning models 130. In an example, feature metadata may include information about performance of generating a set of features, e.g., information how much time is needed to generate the set of features to use for machine learning models 130. In another example, feature metadata may include information how applicable or how much lift for a set of features to give to train machine learning models 130. In another example, feature metadata may include information of a process how a set of features are generated and how the set of features are computed. For example, feature metadata may include information of the combination of subject matter fields and functionality used to compute a feature. Feature metadata may include information of a process using cross-wise and pair-wise iterators to compute a maximum number of feature combinations of the selected subject matter fields and functionality. Feature metadata may include information about a number of statistical calculations performed using the features generated combined with the aggregated results of specific groups within the data. In another example, feature metadata may include information about feature and model lineage or hierarchy, e.g., information about what features depend on what other features and how the features depend on each other when the features are generated to use. Other suitable metadata about the features is possible and can be collected.

Open feature library management 110 may initially collect feature metadata by receiving inputs from data source(s) 104. Open feature library management 110 may also access feature metadata from feature library repository 132 through metadata collector 112 when feature metadata is available from feature library repository 132. Open feature library management 110 may ingest, or feed, source data from data source(s) 104 into feature metadata collector 112 to inspect the source data. In an example, open feature library management 110 may store the ingested source data into source data repository 106. In another example, source data repository 106 may include pre-existing source data.

In an example, data source(s) 104 may be source files. Open feature library management 110 may collect the feature metadata from ingested data source(s) 104, e.g., the ingested source files. Open feature library management 110 may collect the feature metadata from source data repository 106. For example, the feature metadata may include a corpus of text to be reviewed. The input corpus may be a table of records where each row of the table is a record and each cell of the table in that row is a field value for a field associated with the record. The fields may be referred to as column headings. In another example, the input corpus may be a form of unstructured data. The feature metadata may include focal objects to be used in determining a set of features. The feature metadata may include measurements to be used in determining the set of feature values corresponding to the set of features to compute. The feature metadata may include dimensions to be used in determining the set of features. The feature metadata may include identity of the features to compute. In an example, columns in the source files can be defined as subject matter fields that are used to compute a feature. Open feature library management 110 may collect the feature metadata from the source data through inspecting column selection, column values, and column types in the source data. Open feature library management 110 may collect the feature metadata from the source data by evaluating measurements in the source data. Open feature library management 110 may collect the feature metadata from the source data by performing statistical and data analyses on the source data. For example, open feature library management 110 may evaluate the feature metadata from the source data based on the statistical and data analyses. Open feature library management 110 may store the collected feature metadata into feature library repository 132 by metadata collector 112. Feature library repository 132 may communicate and provide feature access to metadata collector 112. Metadata collector 112 may send the collected feature metadata to user interface 114 to access.

In one or more embodiments, open feature library management 110 is configured to provide user interface 114 for configuration management and review of open feature library management 110 to a user. User interface 114 may provide a user an interface to configure and review subject matter data fields (e.g., column selection, column values, and column types), focal objects, measurements, dimensions, and identities of the features to compute. User interface 114 may provide statistics information about the subject matter data fields and the features. User interface 114 may allow a user to manually configure and change the configuration files for features. User interface 114 may allow a user to perform a role override such as overriding a target or a predictor. User interface 114 may allow a user to select to ignore some certain features per the user's selection. User interface 114 may display system parameter settings including an overall state which may include exploration and steady state. User interface 114 may display an inclusion threshold such as for generation cost, model efficacy and efficiency.

In one or more embodiments, open feature library management 110 is configured to build a feature pipeline for features based on the collected feature metadata from metadata collector 112 through feature pipeline builder 116. In an example, open feature library management 110 may create a configuration file to generate a set of defined and active features. In an example, a configuration file may be provided by a user, such as an expert, in the field that is being modeled. A configuration file may define the combination of subject matter fields and functionality used to compute a feature. Open feature library management 110 may automatically use cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., may be performed to retrieve data of the computed features along with the raw data previously ingested by open feature library management 110. In an example, a configuration file may be generated as a JavaScript Object Notation (JSON) file. JSON can be a data interchange format storing and transmitting data objects consisting of attribute—value pairs and array data types. In other examples, the configuration file can be generated in another suitable language or format.

In one or more embodiments, open feature library management 110 is configured to execute the feature pipeline generated in feature pipeline builder 116. Open feature library management 110 may execute the feature pipeline by feature executor 118. Open feature library management 110 may compute a number of feature combinations based on a set of subject matter fields that are selected from a set of subject matter fields and further based on qualifiers that correspond to the selected set of subject matter fields. Open feature library management 110 may store computed features into computed feature repository 136. Open feature library management 110 may also store the computed features into feature library repository 136.

In one or more embodiments, open feature library management 110 is configured to execute machine learning model 130. Open feature library management 110 may train machine learning model 130 using the computed plurality of feature combinations. Open feature library management 110 may use the computed feature values to perform machine learning training on various machine learning algorithms, such as the software of feature determination and/or machine language algorithms used for fraud detection purposes. In one embodiment, open feature library management 110 may result in a single record with a maximum amount of data. Intermediate and final results of steps can be stored along the way in a format that is efficient for later reuse, for example, stored in feature library repository 132. In addition, open feature library management 110 may train machine learning model 130 using the results from statistical and database operations.

In one or more embodiments, open feature library management 110 is configured to evaluate the features and model results through feature evaluator 122. Open feature library management 110 may perform an overall evaluation including generation cost. Open feature library management 110 may perform the feature evaluation including evaluating model effectiveness, for example, importance, general interest index, and automatic artificial intelligence. Open feature library management 110 may perform the feature evaluation including model efficiency, such as generation cost/model effectiveness. Open feature library management 110 may perform the feature evaluation including evaluating a feature role in a model. Open feature library management 110 may use the feature value(s) to perform a scoring function on a machine learning algorithm.

In one or more embodiments, open feature library management 110 is configured to optimize configuration files and features from feature library repository 132. In an example, open feature library management 110 may optimize the configuration files and feature pipelines generated in feature pipeline builder 116. In one embodiment, a configuration file may be provided by a user, such as an expert through user interface 114, in the field that is being modeled. The configuration file may define the combination of subject matter fields and functionality used to compute a feature. Open feature library management 110 may use cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., may be performed to retrieve data of the computed features along with the raw data previously ingested by open feature library management 110. Open feature library management 110 may detect redundancy among a set of features. Open feature library management 110 may perform predecessor evaluation. Open feature library management 110 may perform successor evaluation. Open feature library management 110 may rate a feature against a goal, e.g., overall execution time and overall execution footprint. Open feature library management 110 may update a feature state.

In one or more embodiments, metadata collector 112 is configured to collect feature metadata by receiving inputs from data source(s) 104. In an example, data source(s) 104 may be source files. Open feature library management 110 may ingest, or feed, source data from data source(s) 104 into feature metadata collector 112 to inspect the source data. Feature metadata may be data and information about features that are generated to use to train machine learning model 130. In an example, feature metadata may include information about performance of generating a set of features, e.g., how much time is needed to generate the set of features to use for machine learning model 130. In another example, feature metadata may include information how applicable or how much lift for the set of features to give to train machine learning model 130. In another example, feature metadata may include information of a process how the set of features are generated and how the set of features are computed. For example, feature metadata may include information of combination of subject matter fields and functionality used to compute a feature. Feature metadata may include information of a process using cross-wise and pair-wise iterators to compute a maximum number of feature combinations of the selected subject matter fields and functionality. Feature metadata may include information about a number of statistical calculations performed using the features generated combined with the aggregated results of specific groups within the data. In another example, feature metadata may include information about feature and model lineage or hierarchy, e.g., information about what features depend on what other features and how the features depend on each other when the features are generated to use. Other suitable metadata about the features is possible and can be collected.

Open feature library management 110 may store the ingested source data into source data repository 106. In an example, source data repository 106 may include pre-existing source data. Metadata collector 112 may collect the feature metadata from ingested data source(s) 104, e.g., the ingested source files. Metadata collector 112 may collect the feature metadata from source data repository 106. For example, the feature metadata may include a corpus of text to be reviewed. The input corpus may be a table of records where each row of the table is a record and each cell of the table in that row is a field value for a field associated with the record. The fields may be referred to as column headings. In another example, the input corpus may be a form of unstructured data. The feature metadata may include focal objects to be used in determining a set of features. The feature metadata may include measurements to be used in determining the set of feature values corresponding to the set of features to compute. The feature metadata may include dimensions to be used in determining the set of features. The feature metadata may include identity of the features to compute. In an example, columns in the source files can be defined as subject matter fields that are used to compute a feature. Metadata collector 112 may collect the feature metadata from the source data through inspecting column selection, column values, and column types in the source data. Metadata collector 112 may collect the feature metadata from the source data by evaluating measurements in the source data. Metadata collector 112 may collect the feature metadata from the source data by performing statistical and data analyses on the source data. For example, metadata collector 112 may evaluate the feature metadata from the source data based on the statistical and data analyses. Metadata collector 112 may store the collected feature metadata into feature library repository 132. Feature library repository 132 may communicate and provide feature access to metadata collector 112. Metadata collector 112 may send the collected feature metadata to user interface 114 to access. Metadata collector 112 may send the collected feature metadata to optimizer 124 for optimizing configuration files for building feature pipelines.

In one or more embodiments, user interface 114 is configured to provide configuration management and review of open feature library management 110 to a user. User interface 114 may provide the user an interface to configure and review subject matter data fields (e.g., column selection, column values, and column types), focal objects, measurements, dimensions, and identities of the features to compute. User interface 114 may provide statistics information about the subject matter data fields and the features. User interface 114 may allow a user to manually update a configure configuration file and feature pipeline. User interface 114 may allow a user to perform a role override such as overriding targets and predictors. User interface 114 may allow a user to select to ignore some certain features per the user's selection. User interface 114 may display system parameter settings including an overall state which may include exploration and steady state. User interface 114 may display inclusion thresholds such as for generation cost, model efficacy and efficiency.

In one or more embodiments, feature pipeline builder 116 is configured to build a feature pipeline for features based on the collected feature metadata from metadata collector 112. In an example, feature pipeline builder 116 may create a configuration file for generating a set of defined and active features. In an example, the configuration file may be provided by a user, such as an expert, in the field that is being modeled. The configuration file may define the combination of subject matter fields and functionality used to compute a feature. Feature pipeline builder 116 may automatically use cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., may be performed to retrieve data of the computed features along with the raw data previously ingested by open feature library management 110. In an example, the configuration file may be generated as a JSON file through an open feature generator. The configuration file can be generated in other suitable languages or formats. In an example, feature pipeline builder 116 may save generated configuration files and feature pipelines into feature library repository 132. Feature library repository 132 may keep all configuration files and feature pipelines even after some of configuration files and feature pipelines may be changed or updated in a late process.

In one or more embodiments, feature executor 118 is configured to execute the feature pipeline generated in feature pipeline builder 116. Feature executor 118 may compute a number of feature combinations based on a set of subject matter fields that are selected from a set of subject matter fields and further based on qualifiers that correspond to the selected set of subject matter fields. Feature executor 118 may save the computed features into computed feature repository 136. Feature executor 118 may also save the computed features into feature library repository 136.

In one or more embodiments, model executor 120 is configured to execute machine learning model 130 using the computed features from feature executor 118. Model executor 120 may save model results into model results repository 134. Model executor 120 may train machine learning model 130 using the computed plurality of feature combinations. Model executor 120 may use the computed feature values to perform machine learning training on various machine learning algorithms, such as the software of feature determination and/or machine language algorithms used for fraud detection purposes. In one embodiment, model executor 120 may result in a single record with a maximum amount of data. Intermediate and final results of steps can be stored along the way in a format that is efficient for later reuse, for example, stored in feature library repository 132. In addition, model executor 120 may train machine learning models using the results from statistical and database operations. In an example, model executor 120 may use the computed features stored in computed feature repository 136.

In one or more embodiments, feature evaluator 122 is configured to evaluate the features which has been generated from feature pipeline builder 116 and executed in model executor 120. Feature evaluator 122 may perform an overall evaluation including generation cost. Feature evaluator 122 may perform the feature evaluation including evaluating model effectiveness, for example, importance, general interest index, and automatic artificial intelligence. Feature evaluator 122 may perform the feature evaluation including model efficiency, such as generation cost/model effectiveness. Feature evaluator 122 may perform the feature evaluation including evaluating a feature role in a model. Feature evaluator 122 may use the feature value(s) to perform a scoring function on a machine learning algorithm. Feature evaluator 122 may send the feature evaluated results to optimizer 124 to optimize the configuration files and feature pipelines.

In one or more embodiments, optimizer 124 is configured to optimize configuration files for building feature pipelines. Optimizer 124 may optimize the configuration files for building feature pipelines based on the collected feature metadata from metadata collector 112. In one embodiment, a configuration file may be provided by a user, such as an expert through user interface 114, in the field that is being modeled. The configuration file may define the combination of subject matter fields and functionality used to compute a feature. In one embodiment, a number of statistical calculations are performed using the features generated combined with the aggregated results of specific groups within the data. Optimizer 124 may detect redundancy among a set of features. Optimizer 124 may perform predecessor evaluation. Optimizer 124 may perform successor evaluation. Optimizer 124 may rate a feature against a goal, e.g., overall execution time and overall execution footprint. Optimizer 124 may update the feature state. Optimizer 124 may further optimize the configuration files and feature pipelines based on the feature evaluated results from feature evaluator 122. Configuration files and feature pipelines can be optimized and kept in changes. Optimizer 124 may send the optimized results to feature library repository 132 and metadata collector 112.

Figure 2:
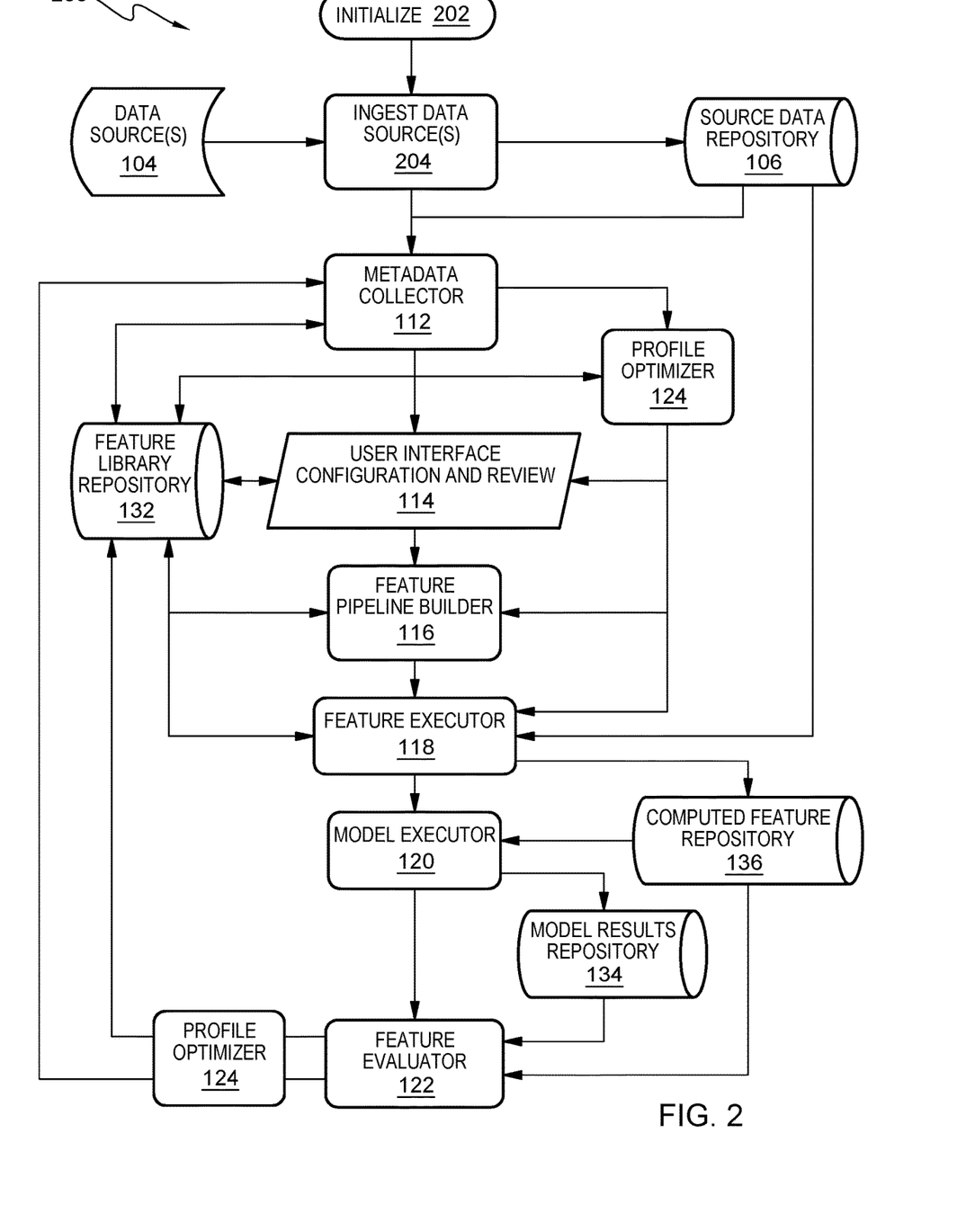
FIG. 2 illustrates an exemplary functional diagram that shows the components used in the open feature library environment of FIG. 1, in accordance with one or more embodiments of the present disclosure.

FIG. 2 illustrates an exemplary functional diagram that shows the components used in open feature library environment 100, in accordance with one or more embodiments of the present disclosure.

In block 202, open feature library management 110 initializes collecting feature metadata by receiving inputs from data source(s) 104. In block 204, open feature library management 110 ingests data source(s) 104. In an example, data source(s) 104 may be source files. Open feature library management 110 may ingest, or feed, source data from data source(s) 104 into feature metadata collector 112 to inspect the source data. Feature metadata may be data and information about features that are generated to use to train machine learning model 130. In an example, feature metadata may include information about performance of generating a set of features, e.g., how much time is needed to generate the set of features to use for machine learning model 130. In another example, feature metadata may include information how applicable or how much lift for the set of features to give to train machine learning model 130. In another example, feature metadata may include information of a process how the set of features are generated and how the set of features are computed. For example, feature metadata may include information of the combination of subject matter fields and functionality used to compute a feature. Feature metadata may include information of a process using cross-wise and pair-wise iterators to compute a maximum number of feature combinations of the selected subject matter fields and functionality. Feature metadata may include information about a number of statistical calculations performed using the features generated combined with the aggregated results of specific groups within the data. In another example, feature metadata may include information about feature and model lineage or hierarchy, e.g., information about what features depend on what other features and how the features depend on each other when the features are generated to use. Other suitable metadata about the features is possible and can be collected.

Open feature library management 110 may store the ingested source data into source data repository 106. In another example, source data repository 106 may include pre-existing source data. Metadata collector 112 may collect the feature metadata from ingested data source(s) 104, e.g., the ingested source files. Metadata collector 112 may collect the feature metadata from source data repository 106. For example, the feature metadata may include a corpus of text to be reviewed. The input corpus may be a table of records where each row of the table is a record and each cell of the table in that row is a field value for a field associated with the record. The fields may be referred to as column headings. In another example, the input corpus may be a form of unstructured data. The feature metadata may include focal objects to be used in determining a set of features. The feature metadata may include measurements to be used in determining the set of feature values corresponding to the set of features to compute. The feature metadata may include dimensions to be used in determining the set of features. The feature metadata may include identity of the features to compute. In an example, columns in the source files can be defined as subject matter fields that are used to compute a feature. Metadata collector 112 may collect the feature metadata from the source data through inspecting column selection, column values, and column types in the source data. Metadata collector 112 may collect the feature metadata from the source data by evaluating measurements in the source data. Metadata collector 112 may collect the feature metadata from the source data by performing statistical and data analyses on the source data. For example, metadata collector 112 may evaluate the feature metadata from the source data based on the statistical and data analyses. Metadata collector 112 may store the collected feature metadata into feature library repository 132 by metadata collector 112. Feature library repository 132 may communicate and provide feature access to metadata collector 112. Metadata collector 112 may send the collected feature metadata to user interface 114 for a user to access. Metadata collector 112 may send the collected feature metadata to optimizer 124 for optimizing configuration files for building feature pipelines.

Optimizer 124 may receive the collected feature metadata for optimizing configuration files for building feature pipelines. Optimizer 124 may optimize the configuration files for building feature pipelines based on the collected feature metadata from metadata collector 112. In one embodiment, a configuration file may be provided by a user, such as an expert through user interface 114, in the field that is being modeled. The configuration file may define the combination of subject matter fields and functionality used to compute a feature. In one embodiment, a number of statistical calculations are performed using the features generated combined with the aggregated results of specific groups within the data. Optimizer 124 may detect redundancy among a set of features. Optimizer 124 may perform predecessor evaluation. Optimizer 124 may perform successor evaluation. Optimizer 124 may rate features against goals, e.g., overall execution time and overall execution footprint. Optimizer 124 may update feature state.

User interface 114 is provided for configuration management and review of open feature library management 110 to a user. User interface 114 may provide a user an interface to configure and review subject matter data fields (e.g., column selection, column values, and column types), focal objects, measurements, dimensions, and identities of the features to compute. User interface 114 may provide statistics information about the subject matter data fields and the features. User interface 114 may allow a user to manually configure configurations files and feature pipelines. User interface 114 may allow a user to perform role overrides such as overriding targets and predictors. User interface 114 may allow a user to select to ignore some certain features per the user's selection. User interface 114 may display system parameter settings including an overall state which may include exploration and steady state. User interface 114 may display inclusion thresholds such as generation cost, model efficacy and efficiency.

Feature pipeline builder 116 may build a feature pipeline for features based on the collected feature metadata from metadata collector 112. In an example, feature pipeline builder 116 may create a configuration file for generating a set of defined and active features. In an example, the configuration file may be provided by a user, such as an expert, in the field that is being modeled. The configuration file may define the combination of subject matter fields and functionality used to compute a feature. Feature pipeline builder 116 may automatically use cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., may be performed to retrieve data of the computed features along with the raw data previously ingested by open feature library management 110. In an example, the configuration file may be generated as a JSON file through an open feature generator. The configuration file can be generated in other suitable languages or formats. In an example, feature pipeline builder 116 may save generated configuration files and feature pipelines into feature library repository 132. Feature library repository 132 may keep all configuration files and feature pipelines even configuration files and feature pipelines may be changed or updated in a late process.

Feature executor 118 may execute the feature pipeline generated in feature pipeline builder 116. Feature executor 118 may compute a number of feature combinations based on a set of subject matter fields that are selected from a set of subject matter fields and further based on qualifiers that correspond to the selected set of subject matter fields. Feature executor 118 may save computed features into computed feature repository 136. Feature executor 118 may also save computed features into feature library repository 136.

Model executor 120 may execute machine learning model 130 using the computed features from feature executor 118. Model executor 120 may save model results into model results repository 134. Model executor 120 may train machine learning model 130 using the computed plurality of feature combinations. Model executor 120 may use the computed feature values to perform machine learning training on various machine learning algorithms, such as the software of feature determination and/or machine language algorithms used for fraud detection purposes. In one embodiment, model executor 120 may result in a single record with a maximum amount of data. Intermediate and final results of steps can be stored along the way in a format that is efficient for later reuse, for example, stored in feature library repository 132. In addition, model executor 120 may train machine learning models using the results from statistical and database operations. In an example, model executor 120 may use the computed features stored in computed feature repository 136.

Feature evaluator 122 may evaluate the features. Feature evaluator 122 may perform an overall evaluation including generation cost. Feature evaluator 122 may perform the feature evaluation including evaluating model effectiveness, for example, importance, general interest index, and automatic artificial intelligence. Feature evaluator 122 may perform the feature evaluation including model efficiency, such as generation cost/model effectiveness. Feature evaluator 122 may perform the feature evaluation including evaluating feature roles in a model. Feature evaluator 122 may use the feature value(s) to perform a scoring function on a machine learning algorithm. Feature evaluator 122 may send the feature evaluated results to optimizer 124 to optimize the configuration files and feature pipelines.

Optimizer 124 may further optimize the configuration files and feature pipelines based on the feature evaluated results from feature evaluator 122. Configuration files and feature pipelines can be optimized and kept in changes. Optimizer 124 may send the optimized results to feature library repository 132 and metadata collector 112. In one embodiment, a configuration file may be provided by a user, such as an expert through user interface 114, in the field that is being modeled. The configuration file may define the combination of subject matter fields and functionality used to compute a feature. Optimizer 124 may detect redundancy among a set of features. Optimizer 124 may identify and remove redundancy among a set of features. Optimizer 124 may perform predecessor evaluation. Optimizer 124 may perform successor evaluation. Optimizer 124 may rate features against goals, e.g., overall execution time and overall execution footprint. Optimizer 124 may update feature state.

Figure 3:
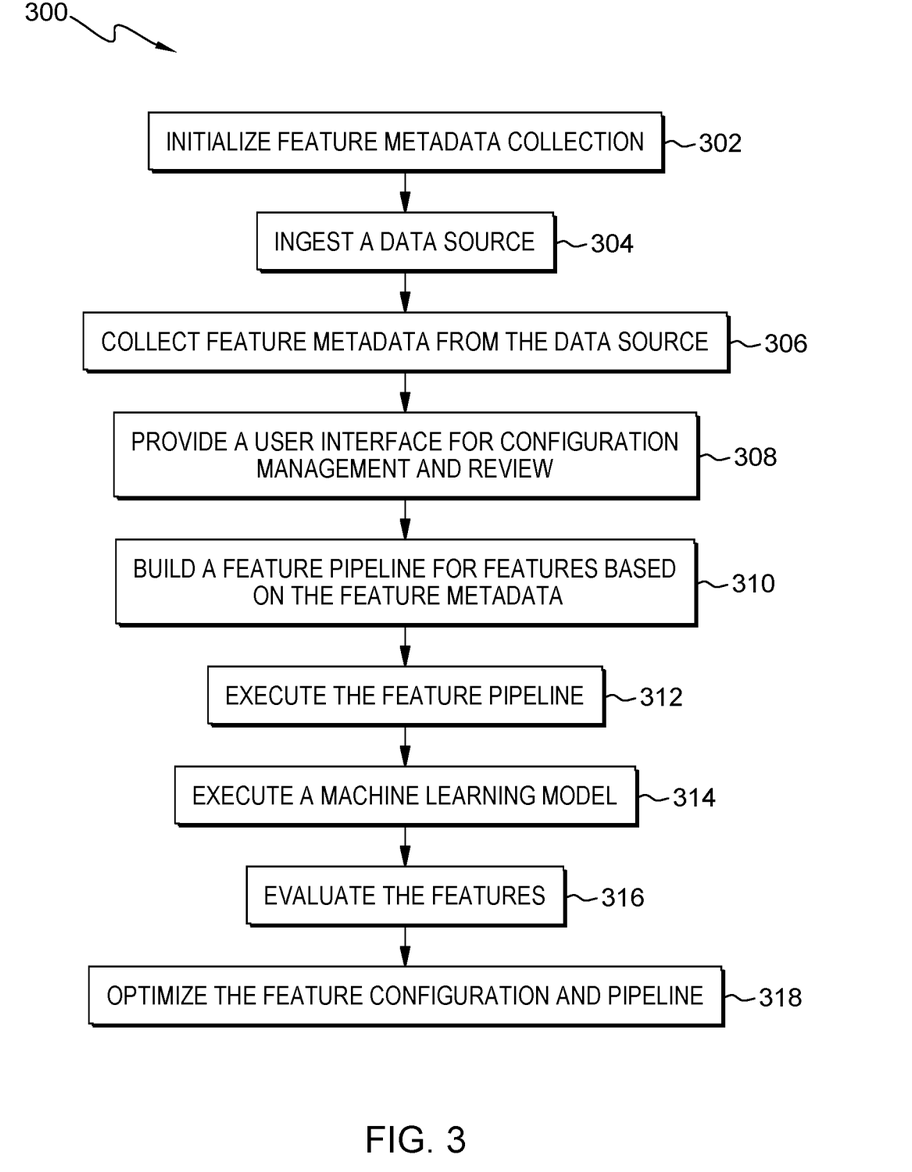
FIG. 3 is a flowchart depicting operational steps of an open feature library management included in a computing device of FIG. 1, in accordance with an embodiment of the present disclosure.

FIG. 3 is a flowchart 300 depicting operational steps of open feature library management 110 in accordance with an embodiment of the present disclosure.

Open feature library management 110 operates to initialize a feature metadata collection. Open feature library management 110 operates to ingest source data from data source(s) 104 into feature metadata collector 112 to inspect the source data. Open feature library management 110 operates to collect the feature metadata from ingested data source(s) 104, e.g., the ingested source files. Open feature library management 110 operates to provide user interface 114 for configuration management and review. Open feature library management 110 operates to build a feature pipeline for features based on the feature metadata. Open feature library management 110 operates to execute the feature pipeline through feature executor 118. Open feature library management 110 operates to execute a machine learning model using model executor 120. Open feature library management 110 operates to evaluate the features and model results using feature evaluator 122. Open feature library management 110 operates to optimize the configuration file and feature pipeline through optimizer 124.

In step 302, open feature library management 110 initializes collecting feature metadata. Feature metadata may be data and information about features that are generated to use to train machine learning models 130. In an example, feature metadata may include information about performance of generating a set of features, e.g., how much time is needed to generate the set of features to use for machine learning model 130. In another example, feature metadata may include information how applicable or how much lift for the set of features to give to train machine learning models 130. In another example, feature metadata may include information of a process how the set of features are generated and how the set of features are computed. For example, feature metadata may include information of the combination of subject matter fields and functionality used to compute a feature. Feature metadata may include information of a process using cross-wise and pair-wise iterators to compute a maximum number of feature combinations of the selected subject matter fields and functionality. Feature metadata may include information about a number of statistical calculations performed using the features generated combined with the aggregated results of specific groups within the data. In another example, feature metadata may include information about feature and model lineage or hierarchy, e.g., information about what features depend on what other features and how the features depend on each other when the features are generated to use. Other suitable metadata about the features is possible and can be collected.

In step 304, open feature library management 110 ingests, or feeds, source data from data source(s) 104 into feature metadata collector 112 to inspect the source data. Data source(s) 104 are sources that open feature library management 110 may receive inputs from. For example, data source(s) 104 may be from network 108, a corpus of electronic files or other data, a content creator, content users, and other possible sources of input. In one embodiment, some or all of the inputs to open feature library management 110 in computing device 102 may be routed through network 108. In one embodiment, a content creator may create content in electronic files for use as part of a corpus of data with open feature library management 110. Electronic files may include any file, text, article, or source of data for use in open feature library management 110. Content users may access open feature library management 110 via a network connection or an Internet connection to network 108. In an embodiment, source data from data source(s) 104 may be stored in source data repository 106. Source data repository 106 may also include pre-existing source data. In an example, open feature library management 110 may store the ingested source data into source data repository 106.

In step 306, open feature library management 110 collects the feature metadata from ingested data source(s) 104, e.g., the ingested source files. Open feature library management 110 may collect the feature metadata from source data repository 106. Open feature library management 110 may collect the feature metadata from feature library repository 132. In an example, the feature metadata may include a corpus of text to be reviewed. The input corpus may be a table of records where each row of the table is a record and each cell of the table in that row is a field value for a field associated with the record. The fields may be referred to as column headings. In another example, the input corpus may be a form of unstructured data. The feature metadata may include focal objects to be used in determining a set of features. The feature metadata may include measurements to be used in determining the set of feature values corresponding to the set of features to compute. The feature metadata may include dimensions to be used in determining the set of features. The feature metadata may include identity of the features to compute. In an example, columns in the source files can be defined as subject matter fields that are used to compute a feature. Open feature library management 110 may collect feature metadata from the source data through inspecting column selection, column values, and column types in the source data. Open feature library management 110 may collect feature metadata from the source data by evaluating measurements in the source data. Open feature library management 110 may collect feature metadata from the source data by performing statistical and data analyses on the source data. For example, open feature library management 110 may evaluate the feature metadata from the source data based on the statistical and data analyses. Open feature library management 110 may store the collected feature metadata into feature library repository 132 by metadata collector 112. Feature library repository 132 may communicate and provide feature access to metadata collector 112. Metadata collector 112 may send the collected feature metadata to user interface 114 for a user to access.

In step 308, open feature library management 110 provides user interface 114 for configuration management and review. User interface 114 is provided for configuration management and review of open feature library management 110 to a user. User interface 114 may provide a user an interface to configure and review subject matter data fields (e.g., column selection, column values, and column types), focal objects, measurements, dimensions, and identities of the features to compute. User interface 114 may provide statistics information about the subject matter data fields and the features. User interface 114 may allow a user to manually configure configurations files and feature pipelines. User interface 114 may allow a user to perform role overrides such as overriding targets and predictors. User interface 114 may allow a user to select to ignore some certain features per the user's selection. User interface 114 may display system parameter settings including an overall state which may include exploration and steady state. User interface 114 may display inclusion thresholds such as generation cost, model efficacy and efficiency.

In step 310, open feature library management 110 builds a feature pipeline for features based on the feature metadata. Open feature library management 110 may build the feature pipeline for features based on the collected feature metadata from metadata collector 112 using feature pipeline builder 116. In an example, open feature library management 110 may create a configuration file for generating a set of defined and active features. In an example, the configuration file may be provided by a user, such as an expert, in the field that is being modeled. The configuration file may define the combination of subject matter fields and functionality used to compute a feature. Open feature library management 110 may automatically use cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., may be performed to retrieve data of the computed features along with the raw data previously ingested by open feature library management 110. In an example, the configuration file may be generated as a JSON file through an open feature generator. The configuration file can be generated in other suitable languages or formats. In an example, open feature library management 110 may save generated configuration files and feature pipelines into feature library repository 132. Feature library repository 132 may keep all configuration files and feature pipelines even configuration files and feature pipelines may be changed or updated in a late process.

In step 312, open feature library management 110 executes the feature pipeline through feature executor 118. Open feature library management 110 may execute the feature pipeline generated in feature pipeline builder 116. Open feature library management 110 may compute a number of feature combinations based on a set of subject matter fields that are selected from a set of subject matter fields and further based on qualifiers that correspond to the selected set of subject matter fields. Open feature library management 110 may save computed features into computed feature repository 136. Open feature library management 110 may also save computed features into feature library repository 136.

In step 314, open feature library management 110 executes a machine learning model using model executor 120. Open feature library management 110 may execute one or more machine learning model 130 using the computed features from feature executor 118. Open feature library management 110 may save model results into model results repository 134. Open feature library management 110 may train machine learning model 130 using the computed plurality of feature combinations. Open feature library management 110 may use the computed feature values to perform machine learning training on various machine learning algorithms, such as the software of feature determination and/or machine language algorithms used for fraud detection purposes. In one embodiment, open feature library management 110 may result in a single record with a maximum amount of data. Intermediate and final results of steps can be stored along the way in a format that is efficient for later reuse, for example, stored in feature library repository 132. In addition, open feature library management 110 may train machine learning models using the results from statistical and database operations. In an example, open feature library management 110 may use the computed features stored in computed feature repository 136.

In step 316, open feature library management 110 evaluates the features and model results using feature evaluator 122. Open feature library management 110 may perform an overall evaluation including generation cost. Open feature library management 110 may perform the feature evaluation including evaluating model effectiveness, for example, importance, general interest index, and automatic artificial intelligence. Open feature library management 110 may perform the feature evaluation including model efficiency, such as generation cost/model effectiveness. Open feature library management 110 may perform the feature evaluation including evaluating feature roles in a model. Open feature library management 110 may use the feature value(s) to perform a scoring function on a machine learning algorithm. Open feature library management 110 may send the feature evaluated results to optimizer 124 to optimize configuration files and feature pipelines.

In step 318, open feature library management 110 optimizes the feature configuration and pipeline through optimizer 124. Open feature library management 110 may optimize the configuration files and feature pipelines based on the feature evaluated results from feature evaluator 122. Configuration files and feature pipelines can be optimized and kept in changes. Open feature library management 110 may send the optimized results to feature library repository 132 and metadata collector 112. In one embodiment, a configuration file may be provided by a user, such as an expert through user interface 114, in the field that is being modeled. The configuration file may define the combination of subject matter fields and functionality used to compute a feature. Open feature library management 110 may detect redundancy among a set of features. Open feature library management 110 may identify and remove redundancy among the set of features. Open feature library management 110 may perform predecessor evaluation. Open feature library management 110 may perform successor evaluation. Open feature library management 110 may rate features against goals, e.g., overall execution time and overall execution footprint. Open feature library management 110 may update feature state.

Figure 4:
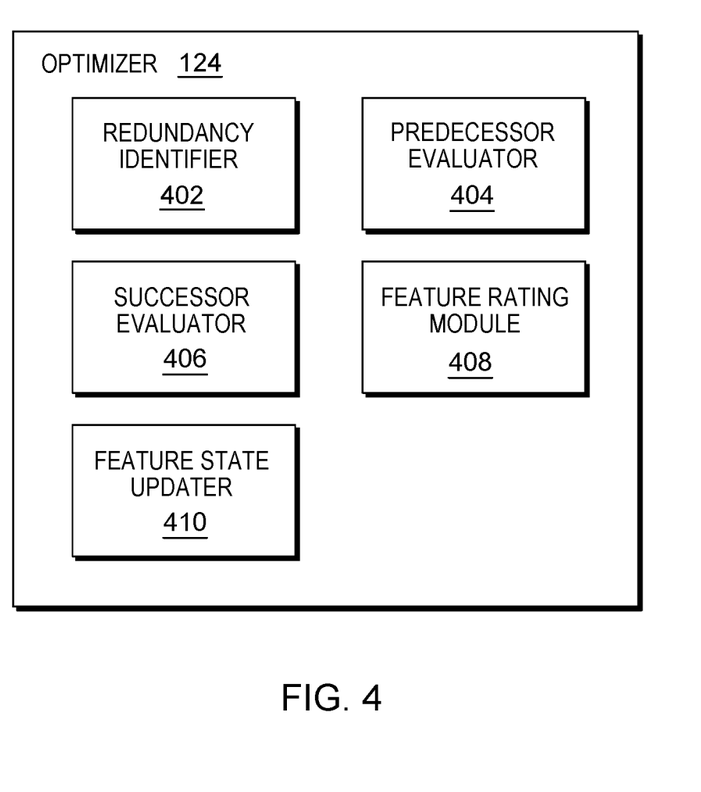
FIG. 4 illustrates an exemplary functional diagram of an optimizer in the open feature library management included in the computing device of FIG. 1, in accordance with an embodiment of the present disclosure.

FIG. 4 illustrates an exemplary functional diagram of optimizer 124 in open feature library management 110 in accordance with one or more embodiments of the present disclosure.

In the depicted embodiment, optimizer 124 includes redundancy identifier 402, predecessor evaluator 404, successor evaluator 406, feature rating module 408, and feature state updater 410. In one or more embodiments, redundancy identifier 402 is configured to identify redundancy among a set of features. Redundancy identifier 402 may remove the identified redundancy among the set of features. In one or more embodiments, predecessor evaluator 404 is configured to perform predecessor evaluation. For example, predecessor evaluator 404 may recognize features that have been used and executed. Predecessor evaluator 404 may analyze upstream or backward impact, e.g., if to make feature configuration changes. In one or more embodiments, successor evaluator 406 is configured to perform successor evaluation. Successor evaluator 406 may analyze downstream or forward impact, e.g., if to make feature configuration changes. In one or more embodiments, feature rating module 408 is configured to rate a feature against a goal. For example, feature rating module 408 may rate a feature against a goal including overall execution time and overall execution footprint. In one or more embodiments, feature rating module 408 is configured to update a feature state. For example, a feature state may indicate a feature is active or inactive. Feature rating module 408 may update the state of the feature accordingly.

Figure 5:
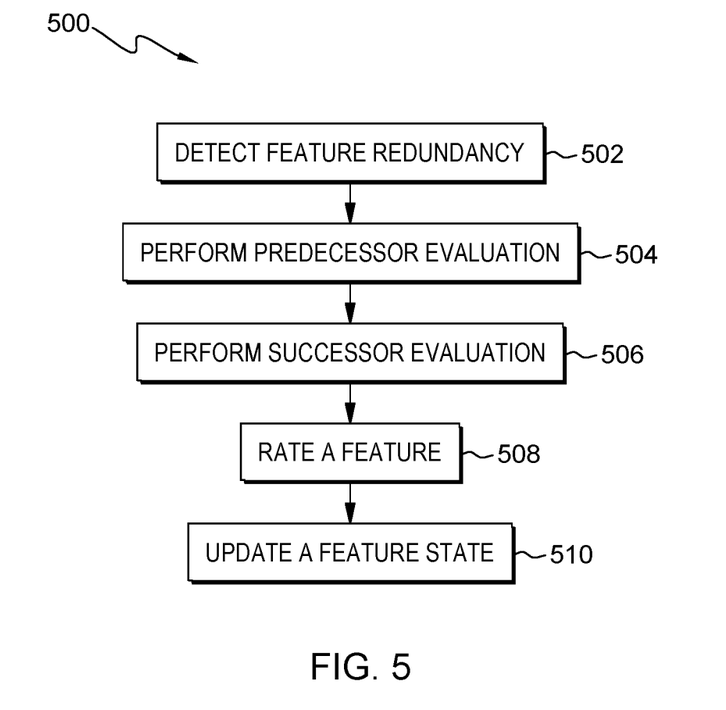
FIG. 5 is a flowchart depicting operational steps of the optimizer in the open feature library management included in the computing device of FIG. 1, in accordance with an embodiment of the present disclosure.

FIG. 5 is a flowchart 500 depicting operational steps of optimizer 124 in accordance with an embodiment of the present disclosure.

Optimizer 124 operates to identify redundancy among a set of features that have been executed in machine learning model 130. Optimizer 124 operates to perform a predecessor evaluation. The predecessor evaluation includes recognizing a feature in the set of features and analyzing an impact of making an upstream feature configuration change relating to the feature. Optimizer 124 operates to perform a successor evaluation. The successor evaluation includes recognizing the feature in the set of features being executed and analyzing an impact of making a downstream feature configuration change relating to the feature. Optimizer 124 operates to rate the feature against a goal. The goal may include overall execution time and overall execution footprint in machine learning model 130. Optimizer 124 operates to update a state of the feature based on the predecessor evaluation, the successor evaluation, and the feature rating.

In step 502, optimizer 124 identifies redundancy among a set of features. The set of features may be previously generated in feature pipeline builder 116, executed in feature executor 118, and executed in model executor 120. Optimizer 124 may remove the identified redundancy among the set of features. In step 504, optimizer 124 performs a predecessor evaluation. Optimizer 124 may recognize a feature in the set of features being executed and may analyze an impact of making an upstream feature configuration change relating to the feature. For example, optimizer 124 may recognize features that have been used and executed. Optimizer 124 may analyze upstream or backward impact, e.g., if to make feature configuration changes. In step 506, optimizer 124 performs a successor evaluation. Optimizer 124 may recognize the feature in the set of features being executed and may analyze an impact of making a downstream feature configuration change relating to the feature. For example, optimizer 124 may analyze downstream or forward impact, e.g., if to make feature configuration changes. In step 508, optimizer 124 rates a feature against a goal including overall execution time and overall execution footprint. For example, optimizer 124 may rate the feature based on the overall execution time and overall execution footprint in feature pipeline builder 116, executed in feature executor 118, and executed in model executor 120. In step 510, optimizer 124 updates a feature state. optimizer 124 may update a state of the feature based on the predecessor evaluation, the successor evaluation, and the feature rating. For example, a feature state may indicate a feature is active or inactive. Optimizer 124 may update the state of the feature accordingly.

Figure 6:
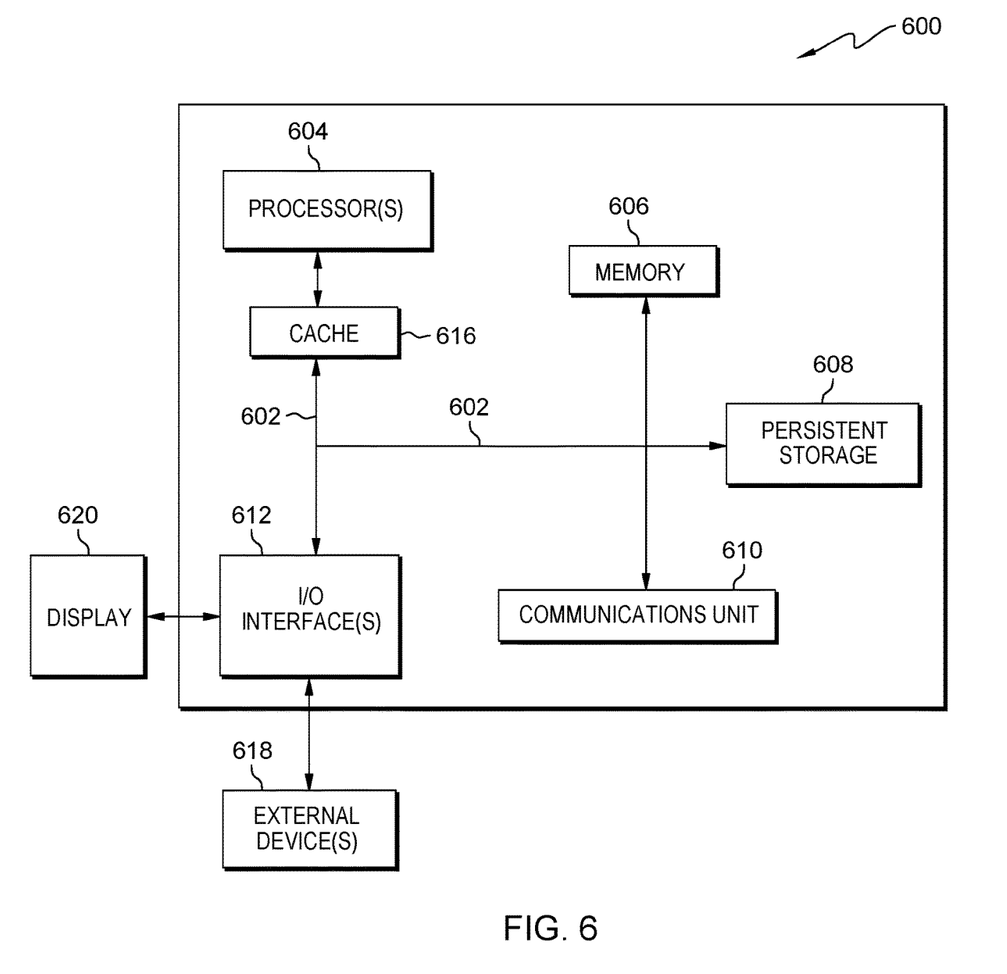
FIG. 6 is a block diagram of components of the computing device of FIG. 1, in accordance with an embodiment of the present disclosure.

FIG. 6 depicts a block diagram 600 of components of computing device 102 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computing device 102 may include communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Open feature library management 110 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Open feature library management 110 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., open feature library management 110 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method, comprising:
    collecting, by one or more processors, feature metadata from a data source, the feature metadata being data related to features for training a machine learning model; wherein said feature metadata is collected by an open library manager and stored in a repository;
    building, by one or more processors, a feature pipeline for the features based on the collected feature metadata, the feature pipeline being a set of defined and active features;
    executing, by one or more processors, the feature pipeline including computing the features; wherein said computing defines a combination of subject matter fields and functionality and a maximum number of feature combinations of a selected subject matter fields and functionality;
    executing, by one or more processors, said machine learning model using the computed features;
    evaluating, by one or more processors, the features and corresponding model results; and
    optimizing, by one or more processors, feature configuration and said pipeline features by identifying and removing redundancy among said set of defined and active features based on evaluation by said one or more processors.

2. The computer implemented method of claim 1, further comprising:
    initializing, by one or more processors, the feature metadata collection with ingested source data from the data source.

3. The computer-implemented method of claim 1, wherein collecting the feature metadata comprises inspecting column selection, column values, and column types in the source data, evaluating measurements in the source data, and performing statistical and data analysis on the source data.

4. The computer-implemented method of claim 1, wherein collecting the feature metadata comprises:
receiving inputs from a feature library repository, and
storing the collected metadata into the feature library repository.

5. The computer-implemented method of claim 1, further comprising:
providing, by one or more processors, a user interface for configuration management and review, the user interface providing an interface for:
configuring and reviewing subject matter data fields, focal objects, measurements, dimensions, and identities of the features to compute,
presenting statistics information about the subject matter data fields and the features,
manually updating a configure file and feature pipeline,
performing role overrides including overriding targets and predictors, and displaying system parameter settings including an overall state and an inclusion threshold for generation cost, model efficacy and efficiency.

6. The computer-implemented method of claim 1, wherein building the feature pipeline comprises creating a configuration file for generating the set of defined and active features, the configuration file defining the combination of subject matter fields and functionality used to compute a feature.

7. The computer-implemented method of claim 1, wherein evaluating the features and model results comprises:
performing an overall evaluation of generation cost,
evaluating model effectiveness,
evaluating a feature role in a model, and
performing a scoring function on a machine learning algorithm.

8. A computer program product comprising:
one or more computer readable storage media, and program instructions collectively stored on the one or more computer readable storage media, the program instructions comprising:
program instructions to collect feature metadata from a data source, the feature metadata being data related to features for training a machine learning model; wherein said feature metadata is collected by an open library manager and stored in a repository;
program instructions to build a feature pipeline for the features based on the collected feature metadata, the feature pipeline being a set of defined and active features; wherein said computing defines a combination of subject matter fields and functionality and a maximum number of feature combinations of a selected subject matter fields and functionality;
program instructions to execute a machine learning model using the computed features;
program instructions to evaluate the features and corresponding model results; and
program instructions to optimize feature configuration and said pipeline features by identifying and removing redundancy among said set of defined and active features based on evaluation by said one or more processors.

9. The computer program product of claim 8, further comprising:
program instructions, stored on the one or more computer-readable storage media, to initialize the feature metadata collection with ingested source data from the data source.

10. The computer program product of claim 8, wherein program instructions to collect the feature metadata comprise program instructions to inspect column selection, column values, and column types in the source data, to evaluate measurements in the source data, and to perform statistical and data analysis on the source data.

11. The computer program product of claim 8, wherein instructions to collect the feature metadata comprise:
instructions to receive inputs from a feature library repository, and instructions to store the collected metadata into the feature library repository.

12. The computer program product of claim 8, further comprising:
program instructions, stored on the one or more computer-readable storage media, to provide a user interface for configuration management and review, the user interface providing an interface for:
configuring and reviewing subject matter data fields, focal objects, measurements, dimensions, and identities of the features to compute,
presenting statistics information about the subject matter data fields and the features, manually updating a configure file and feature pipeline,
performing role overrides including overriding targets and predictors, and displaying system parameter settings including an overall state and an inclusion threshold for generation cost, model efficacy and efficiency.

13. The computer program product of claim 8, wherein instructions to build the feature pipeline comprise instructions to create a configuration file for generating a set of defined and active features, the configuration file defining the combination of subject matter fields and functionality used to compute a feature.

14. The computer program product of claim 8, wherein instructions to evaluate the features and model results comprise instructions to: perform an overall evaluation of generation cost,
evaluate model effectiveness,
evaluate a feature role in a model, and
perform a scoring function on a machine learning algorithm.

15. A computer system, comprising:
one or more computer processors, one or more computer readable storage media, and
program instructions to collect feature metadata from a data source, the feature metadata being data related to features for training a machine learning model; wherein said feature metadata is collected by an open library manager and stored in a repository;
program instructions to build a feature pipeline for the features based on the collected feature metadata, the feature pipeline being a set of defined and active features; wherein said computing defines a combination of subject matter fields and functionality and a maximum number of feature combinations of a selected subject matter fields and functionality;
program instructions to execute a machine learning model using the computed features;
program instructions to evaluate the features and corresponding model results; and
program instructions to optimize feature configuration and said pipeline features by identifying and removing redundancy among said set of defined and active features based on evaluation by said one or more processors.

16. The computer system of claim 15, further comprising:
program instructions, stored on the one or more computer-readable storage media, to initialize the feature metadata collection with ingested source data from the data source.

17. The computer system of claim 15, wherein program instructions to collect the feature metadata comprise program instructions to inspect column selection, column values, and column types in the source data, to evaluate measurements in the source data, and to perform statistical and data analysis on the source data.

18. The computer system of claim 15, further comprising:
program instructions, stored on the one or more computer-readable storage media, to provide a user interface for configuration management and review, the user interface providing an interface for:
configuring and reviewing subject matter data fields, focal objects, measurements, dimensions, and identities of the features to compute,
presenting statistics information about the subject matter data fields and the features, manually updating a configure file and feature pipeline,
performing role overrides including overriding targets and predictors, and
displaying system parameter settings including an overall state and an inclusion threshold for generation cost, model efficacy and efficiency.

19. The computer system of claim 15, wherein instructions to build the feature pipeline comprise instructions to create a configuration file for generating a set of defined and active features, the configuration file defining the combination of subject matter fields and functionality used to compute a feature.

20. The computer system of claim 15, wherein instructions to evaluate the features and model results comprise instructions to:
perform an overall evaluation of generation cost,
evaluate model effectiveness,
evaluate a feature role in a model, and
perform a scoring function on a machine learning algorithm.

* * * * *